US010859143B2

United States Patent
Chung et al.

(10) Patent No.: US 10,859,143 B2
(45) Date of Patent: Dec. 8, 2020

(54) LINEAR DRIVING SYSTEM

(71) Applicant: DELTA ELECTRONICS, INC., Taoyuan (TW)

(72) Inventors: Chi-Wen Chung, Taoyuan (TW); Chun-Chin Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 29 days.

(21) Appl. No.: 15/879,185

(22) Filed: Jan. 24, 2018

(65) Prior Publication Data

US 2018/0335113 A1 Nov. 22, 2018

Related U.S. Application Data

(60) Provisional application No. 62/508,238, filed on May 18, 2017.

(30) Foreign Application Priority Data

Nov. 22, 2017 (TW) .............................. 106140438 A

(51) Int. Cl.
*F16H 25/20* (2006.01)
(52) U.S. Cl.
CPC ..... *F16H 25/20* (2013.01); *F16H 2025/2078* (2013.01)
(58) Field of Classification Search
CPC ............. F16H 25/20; F16H 2025/2078; F16H 2025/204; F16H 2025/2075; H02K 7/06
USPC .................................. 74/89.23; 310/75 D, 80
See application file for complete search history.

(56) References Cited

U.S. PATENT DOCUMENTS

| 4,948,091 A * | 8/1990 | Satoh | F16K 1/12 |
| | | | 251/129.11 |
| 5,099,161 A * | 3/1992 | Wolfbauer, III | F16H 25/20 |
| | | | 310/80 |
| 6,453,761 B1 * | 9/2002 | Babinski | H02K 7/06 |
| | | | 29/898.06 |

(Continued)

FOREIGN PATENT DOCUMENTS

| CN | 103855888 A | 6/2014 |
| CN | 104115374 A | 10/2014 |

(Continued)

*Primary Examiner* — Victor L MacArthur
*Assistant Examiner* — Gregory Robert Weber
(74) *Attorney, Agent, or Firm* — Kirton McConkie; Evan R. Witt

(57) ABSTRACT

The linear driving system comprises a motor, a screw shaft and a table. The motor comprises a rotor, a stator and a ball bearing. The stator comprises a shaft part and a spiral part. The shaft part and the spiral part jointly comprise an accommodation space. The spiral part comprises a first helical protrusion formed on the inner surface thereof. The screw shaft is coaxially coupled with the rotor. One end of the screw shaft comprises a second helical protrusion formed on the outer surface thereof, and the screw shaft is accommodated within the accommodation space. The table is fixed on the other end of the screw shaft. The first helical protrusion is engaged with the second helical protrusion. When the rotor is rotated, the rotor drives the screw shaft and the table to move forward or backward linearly in the direction of the axial of the rotor.

15 Claims, 9 Drawing Sheets

(56) References Cited

U.S. PATENT DOCUMENTS

| | | | | |
|---|---|---|---|---|
| 9,021,910 | B2* | 5/2015 | Arlt | F16H 25/2204 74/388 PS |
| 2006/0102697 | A1* | 5/2006 | Nagai | F16H 25/2021 228/101 |
| 2009/0001837 | A1 | 1/2009 | Welle et al. | |
| 2014/0047936 | A1 | 2/2014 | Arlt et al. | |
| 2015/0015104 | A1* | 1/2015 | Kataoka | H02K 7/06 310/80 |
| 2018/0251150 | A1* | 9/2018 | Ognibene | B62D 5/0427 |

FOREIGN PATENT DOCUMENTS

| | | |
|---|---|---|
| CN | 104373540 A | 2/2015 |
| JP | 2011169349 A | 9/2011 |
| TW | 201217202 A | 5/2012 |
| TW | M450137 | 4/2013 |
| TW | 201509077 A | 3/2015 |

* cited by examiner

LINEAR DRIVING SYSTEM

CROSS-REFERENCE TO RELATED APPLICATION

This application claims the benefit of U.S. Provisional Application Ser. No. 62/508,238 filed on May 18, 2017, and claims priority to Taiwan Patent Application No. 106140438 filed on Nov. 22, 2017, the entire contents of which are incorporated herein by reference for all purposes.

FIELD OF THE INVENTION

The present invention relates to a linear driving system, and more particularly to a linear driving system without a coupling.

BACKGROUND OF THE INVENTION

Linear driving system is well known in the art and used in a variety of applications, such as industrial machinery, precision machine tools, electronic machinery, transport machinery, and etc. The linear driving system conventionally converts the rotary motion of an electric motor to linear motion by using a screw device.

FIG. 1 is a schematic longitudinal cross-sectional view showing a conventional linear driving system. The conventional linear driving system 1 comprises an electric motor 11, a ballscrew device 12, a coupling 13, a frame 14, a bearing 15, and a lock-nut 16. The electric motor 11 comprises a rotor 111, a stator 112, and a motor shaft 113. The motor shaft 113 is disposed in the rotor 111. The rotor 111 comprises a plurality of permanent magnets 114 disposed thereon, and the stator 112 comprises windings which carry currents that interact with the magnetic field of the permanent magnets 114 of the rotor 111, so that a driving force is generated to drive the motor shaft 113 of the rotor 111 to rotate.

The ballscrew device 12 is disposed in the frame 14 and comprises a screw shaft 121, a carriage-nut 122, a table 123, a linear bearing 124 and a supporting bearing 125. One end portion of the screw shaft 121 of the ballscrew device 12 is coaxially connected to the motor shaft 113 of the electric motor 11 via the coupling 13. Namely, the coupling 13 is interconnected with the motor shaft 113 of the electric motor 11 and the screw shaft 121 of the ballscrew device 12 for allowing the screw shaft 121 of the ballscrew device 12 to be rotated according to the rotary motion of the motor shaft 113 of the electric motor 11. The carriage-nut 122 is threadably engaged with the screw shaft 121, and the table 123 is fixed to the carriage-nut 122 for carrying a load thereon. The carriage-nut 122 incorporates rolling elements (not shown), such as balls, between the screw shaft 121 and the carriage-nut 122. Consequently, a linear driving system is achieved. The linear bearing 124 is connected with the carriage-nut 122 and disposed in the frame 14 for holding the carriage-nut 122 in a non-rotatable state and guiding the carriage-nut 122 to move in a linear direction. Consequently, the carriage-nut 122 is moved along the screw shaft 121 when the screw shaft 121 of the ballscrew device 12 is rotated by the driving of the electric motor 11. The supporting bearing 125 is disposed in the frame 14 and configured to support the other end portion of the screw shaft 121 of the ballscrew device 12, so that the end portion of the screw shaft 121 is axially immovably relative to the frame 14.

When the motor shaft 113 of the electric motor 11 and the screw shaft 121 of the ballscrew device 12 are coupled together via the coupling 13, a bearing 15 is employed to radially support the end portion of the screw shaft 121, so that the rigidity of the electric motor 11 can be increased. In addition, a lock-nut 16 is fixed on the screw shaft 121 and located between the coupling 13 and the bearing 15 for applying a pre-pressure on the bearing 15 and limiting the bearing 15 to move in an axial direction relative to the screw shaft 121.

The conventional linear driving system 1 employs a coupling 13 to couple the motor shaft 113 of the electric motor 11 and the screw shaft 121 of the ballscrew device 12 together. However, the rigidity of the coupling 13 is weak. Consequently, the rigidity of the linear driving system 1 is degraded, and the response speed of the linear driving system 1 can't be promoted. In addition, in order to secure the bearing 15, a lock-nut 16 must be fixed on the screw shaft 121 and located between the coupling 13 and the bearing 15 for applying a pre-pressure on the bearing 15 and limiting the bearing 15 to move in an axial direction relative to the screw shaft 121. Consequently, the coupling structure between the motor shaft 113 of the electric motor 11 and the screw shaft 121 of the ballscrew device 12 is complex, the space for coupling the motor shaft 113 of the electric motor 11 and the screw shaft 121 of the ballscrew device 12 is increased, and the whole length of the linear driving system 1 is increased.

Therefore, there is a need of providing a linear driving system to obviate the drawbacks encountered from the prior arts.

SUMMARY OF THE INVENTION

The present disclosure provides a linear driving system capable of omitting a coupling and a lock-nut fixed with the bearing in order to enhance rigidity, reduce the cost, and save the assembling space.

The present disclosure also provides a linear driving system capable of connecting a screw shaft and a rotor without using a coupling in order to enhance rigidity, enhance response speed and reduce the cost, and a spiral part is configured as the nut of the screw shaft in order to save the assembling space and maintain it easily.

In accordance with an aspect of the present disclosure, there is provided a linear driving system. The linear driving system comprises a motor, a screw shaft and a table. The motor comprises a rotor, a stator and a ball bearing. The stator comprises a shaft part and a spiral part. The shaft part and the spiral part jointly comprise an accommodation space. The spiral part comprises a first helical protrusion formed on the inner surface thereof. The screw shaft is coaxially coupled with the rotor. One end of the screw shaft comprises a second helical protrusion formed on the outer surface thereof, and at least portion of the end of the screw shaft is accommodated within the accommodation space of the rotor. The table is fixed on the other end of the screw shaft. The first helical protrusion of the spiral part of the rotor is engaged with the second helical protrusion of the screw shaft. When the rotor is rotated, the rotor drives the screw shaft and the table connected with the screw shaft to move forward or backward linearly in the axial direction of the rotor.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
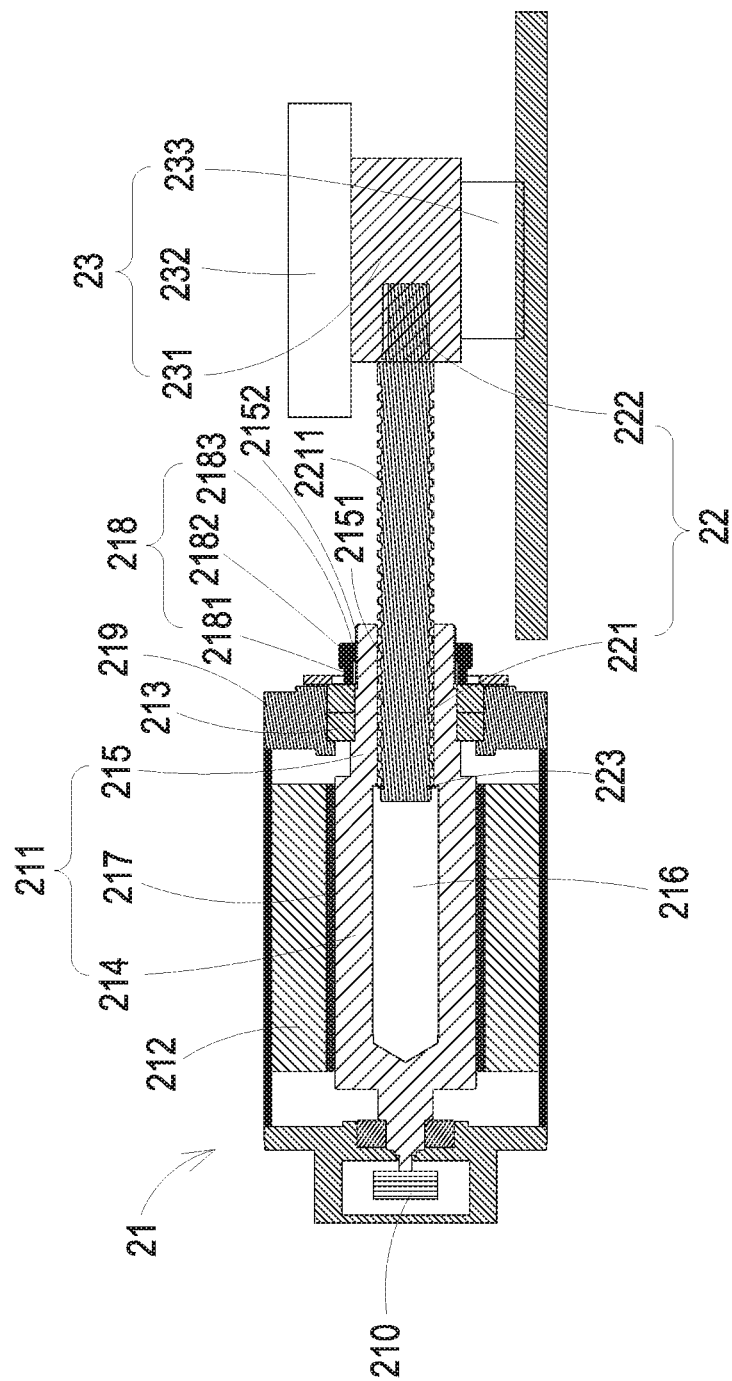
FIG. 2 is a schematic longitudinal cross-sectional view showing a linear driving system according to a first embodiment of the present invention.
Figure 3:
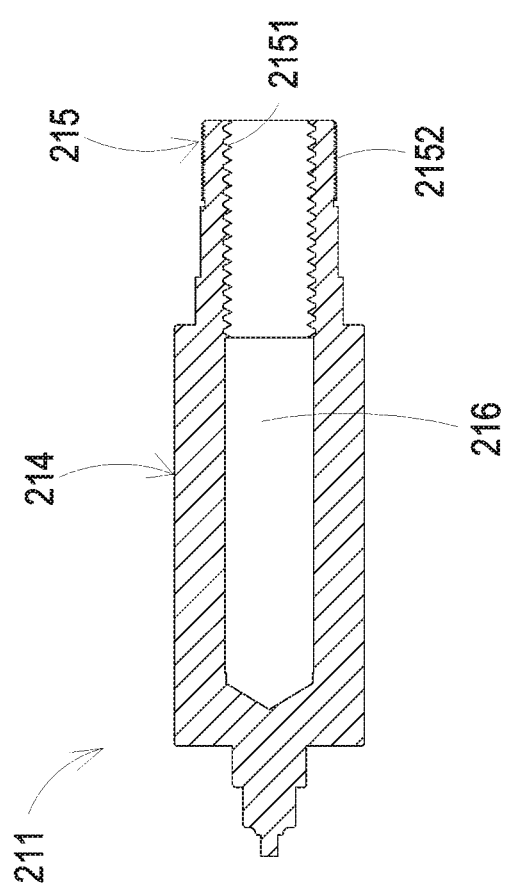
FIG. 3 is an enlarged partial view illustrating the linear driving system of FIG. 2.

FIG. 2 is a schematic longitudinal cross-sectional view showing a linear driving system according to a first embodiment of the present invention, and FIG. 3 is an enlarged partial view illustrating the linear driving system of FIG. 2. As shown in FIGS. 2 and 3, the linear driving system 2 comprises a motor 21, a screw shaft 22 and a table 23. Preferably but not exclusively, the motor 21 is a servo motor. The motor 21 comprises a rotor 211, a stator 212 and a ball bearing 213. The rotor 211 comprises a shaft part 214 and a spiral part 215. The shaft part 214 is connected with the spiral part 215. The shaft part 214 and the spiral part 215 are joined end-to-end in a collinear configuration. The shaft part 214 and the spiral part 215 jointly comprise an accommodation space 216. Namely, the accommodation space 216 is a hollow space within the shaft part 214 and the spiral part 215. The shaft part 214 is free of helical protrusion formed on an inner surface thereof. The spiral part 215 comprises a first helical protrusion 2151 formed on the inner surface thereof.

In this embodiment, the rotor 211 further comprises a plurality of permanent magnets 217 disposed around the outer periphery of the shaft part 214 of the rotor 211. The stator 212 is disposed around the outer periphery of the permanent magnet 217 of the rotor 211. The stator 212 further comprises a plurality of windings (not shown) carrying currents that interact with the magnetic field of the pluralities of permanent magnet 217 of the rotor 211. Consequently, a driving force is generated to rotate the shaft part 214 of the rotor 211 and the spiral part 215 of the rotor 211, and the first helical protrusion 2151 of the spiral part 215 is rotated accordingly.

The ball bearing 213 of the motor 21 is disposed on the outer surface of the spiral part 215. When the rotor 211 rotates by the driving of a driving force, the ball bearing 213 is configured to support the rotor 211 for rotating. Preferably but not exclusively, the ball bearing 213 is an angular ball bearing. A pair of the ball bearings 213 is symmetrically disposed on the outer surface of the spiral part 215. Preferably but not exclusively, the motor 21 includes two or four ball bearings 213.

The screw shaft 22 is coaxially coupled with the rotor 211 of the motor 21. The screw shaft 22 comprises a first end portion 221 and a second end portion 222. At least portion of the first end portion 221 is accommodated within the accommodation space 216 of the rotor 211. The first end portion 221 comprises a second helical protrusion 2211 formed on the outer surface thereof. The first helical protrusion 2151 is engaged with the second helical protrusion 2211, so that the spiral part 215 of the rotor 211 of the motor 21 is connected with the screw shaft 22. The spiral part 215 is configured as the nut of the screw shaft 22. The second helical protrusion 2211 is equally distributed from one end of the first end portion 221 to the other end of the first end portion 221 connected with the second end portion 222. When the rotor 211 is rotated by the driving force, the first helical protrusion 2151 of the spiral part 215 is rotated accordingly, and the second helical protrusion 2211 engaged with the first helical protrusion 2151 is driven to rotate, so that the spiral part 215 drives the screw shaft 22 moves forward or backward linearly in the direction of the axial of the rotor 211. In some embodiments, the moving length of the screw shaft 22 is equal to the length of the accommodation space 216.

The table 23 is fixed on the second end portion 222 of the screw shaft 22 for carrying a load (not shown). When the screw shaft 22 moves forward or backward linearly in the axial direction of the rotor 211, the screw shaft 22 drives the table 23 to move forward or backward linearly in the axial direction of the rotor 211, so that the rotary motion of the motor 21 transfers to the linear motion of the table 23.

Figure 1:
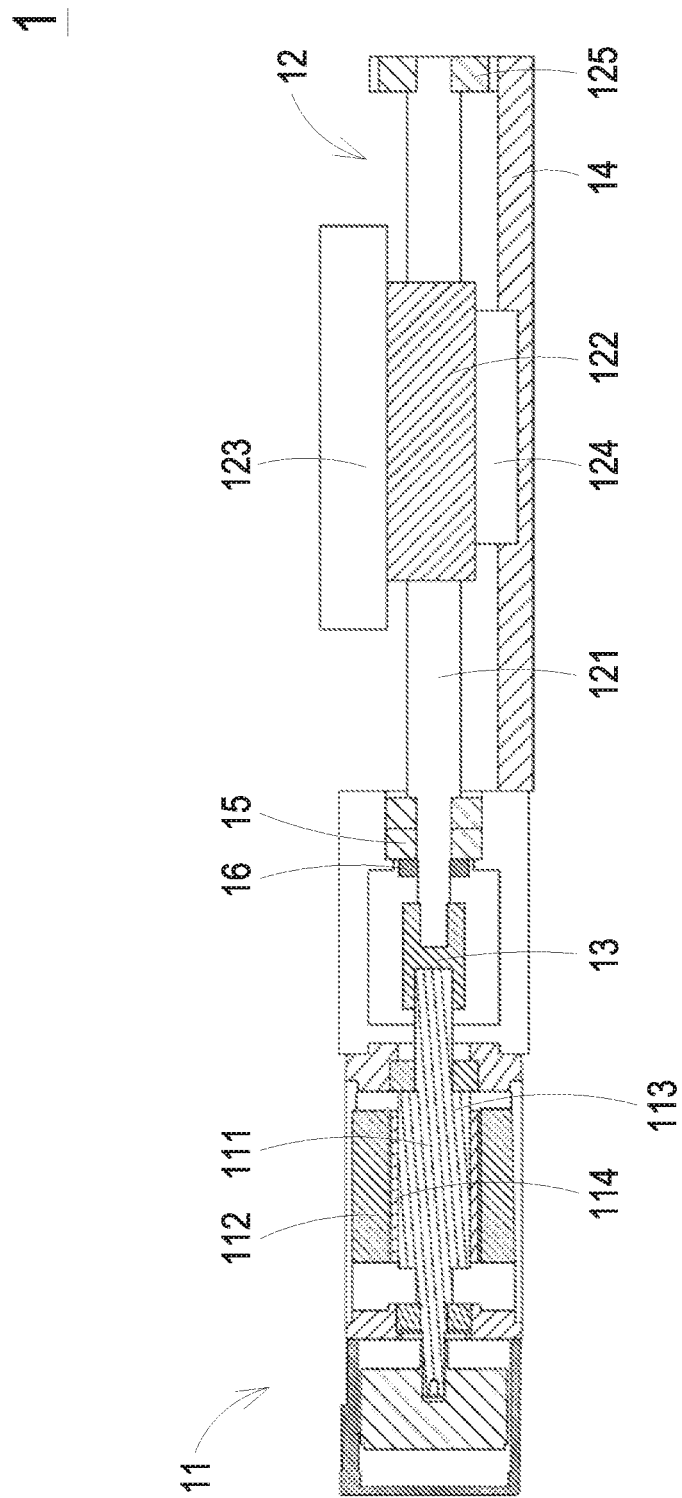
FIG. 1 is a schematic longitudinal cross-sectional view showing a conventional linear driving system.

As mentioned above, the first end portion 221 of the screw shaft 22 is accommodated within the accommodation space 216 of the rotor 211, so that the first end portion 221 of the screw shaft 22 is directly connected with the rotor 211 and accommodated within the accommodation space 216 of the rotor 211 without installing additional device to connect with the screw shaft 22 and the rotor 211 of the motor 21. Therefore, the inventive linear driving system 2 has enhanced rigidity, faster response speed, and lower cost. In addition, the first helical protrusion 2151 is engaged with the second helical protrusion 2211 for connecting with the spiral part 215 of the rotor 211 of the motor 21 and the screw shaft 22, so that the spiral part 215 is configured as the nut of the screw shaft 22. According to the conventional linear driving system 1, it is necessary to dispose a bearing 15 beside the electric motor 11 to fix the screw shaft 121, and a lock-nut 16 must be fixed for fixing the securing the bearing 15. Comparing with the conventional linear driving system 1, a bearing 15 and a lock-nut 16 in the conventional linear driving system 1 of FIG. 1 can be omitted, and the linear driving system 2 of present invention is advantageous because of lower cost, saving assembling space and easier maintaining.

Please refer to FIGS. 2 and 3 again. The shaft part 214 and the spiral part 215 of the linear driving system 2 are integrally formed into one piece. The spiral part 215 comprises a third helical protrusion 2152 formed on the outer surface thereof and the third helical protrusion 2152 is a jagged structure.

Moreover, the ball bearing 213 is disposed around the outer surface of the spiral part 215 and one end of the motor 21 adjacent to the load so as to increase the rigidity of the motor 21. The motor 21 of the linear driving system 2 further comprises a fixing element 218 disposed on the outer surface of the spiral part 215 of the rotor 211. The fixing element 218 is adjacent to the ball bearing 213. The fixing element 218 comprises a first end 2181 and a second end 2182. The first end 2181 of the fixing element 218 is adjacent to the ball bearing 213 and inserts into the ball bearing 213, so that the ball bearing 213 is fixed on the spiral part 215 by the fixing element 218. The second end 2182 of the fixing element 218 comprises a fourth thread 2183 formed on the inner surface thereof. The fourth thread 2183 is adjacent to the outer surface of the spiral part 215. The fourth thread 2183 is engaged with the third thread 2152 of the spiral part 215, so that the fixing element 218 is connected with the spiral part 215. In another embodiment, the motor 21 further comprises a supporting element 219 adjacent to the ball bearing 213 for supporting the ball bearing 213.

Furthermore, the table 23 comprises a block 231, a platform 232 and a linear bearing 233. The block 231 of the table 23 is connected with the second end portion 222 of the screw shaft 22. When the screw shaft 22 moves forward or backward linearly, the block 231 drives the table 23 to move forward or backward linearly. The platform 232 is disposed on the top of the block 231 for carrying a load (not shown). When the table 23 moves forward or backward linearly, the table 23 drives the load to move forward or backward linearly. The linear bearing 233 is disposed under the block 231 for preventing the block 231 from deviating the track of the outer frame (not shown) of the linear driving system 2 when the block 231 moves forward or backward linearly on the outer frame of the linear driving system 2. In some embodiments, the linear bearing 233 is limited with a guide rail, so that the table 23 is limited with the guide rail. Therefore, the screw shaft 22 connected with the table 23 is limited with the guide rail, that means the rotating of degree of freedom of the screw shaft 22 is limited with the guide rail.

In some embodiments, the motor 21 further comprises a position sensor 210, such as an encoder, disposed at the tip of the shaft part 214 of the rotor 211 for sensing the rotary position of the rotor 211. The screw shaft 22 further comprises a plurality of baffle plate 223 disposed on the surface of the first end portion 221 of the screw shaft 22. The baffle plate 223 is configured to prevent the screw shaft 22 from detaching from the rotor 211 when the screw shaft 22 moves forward or backward linearly.

Figure 4:
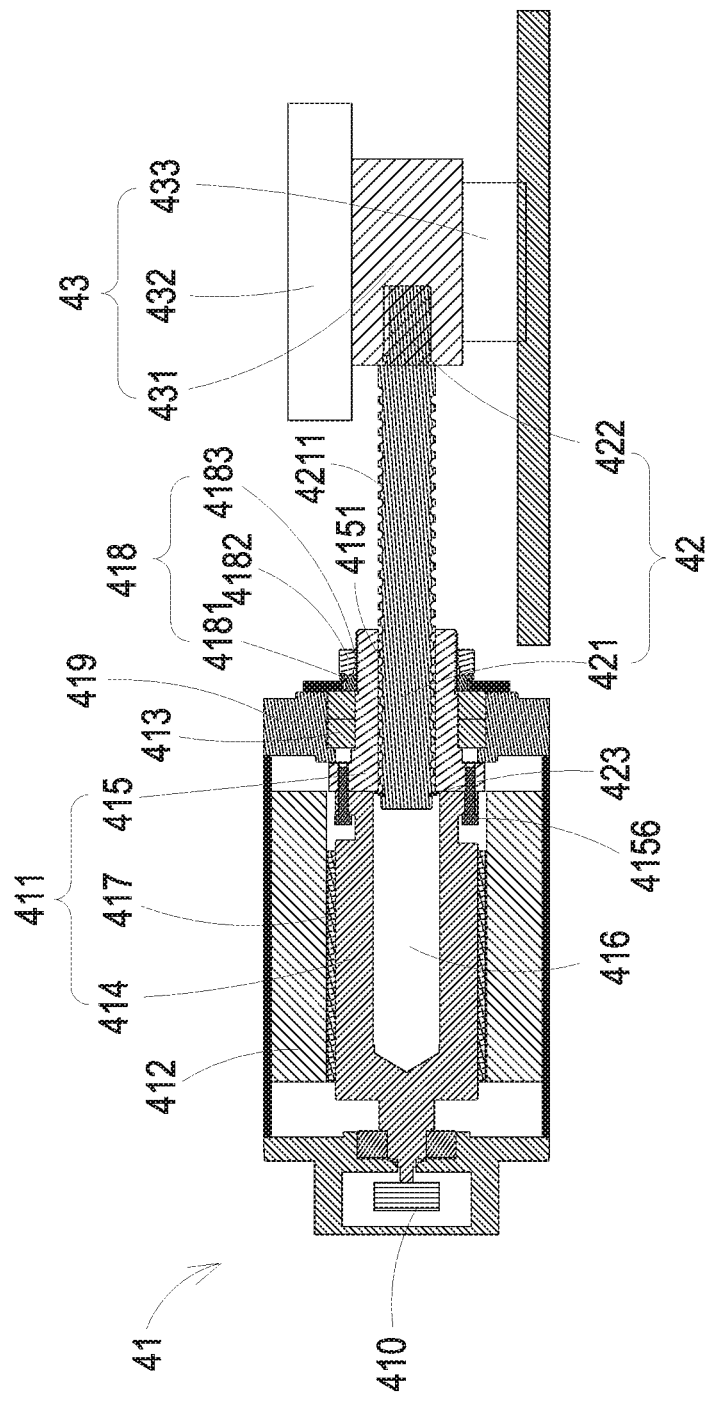
FIG. 4 is a schematic longitudinal cross-sectional view showing a linear driving system according to a second embodiment of the present invention.
Figure 5:
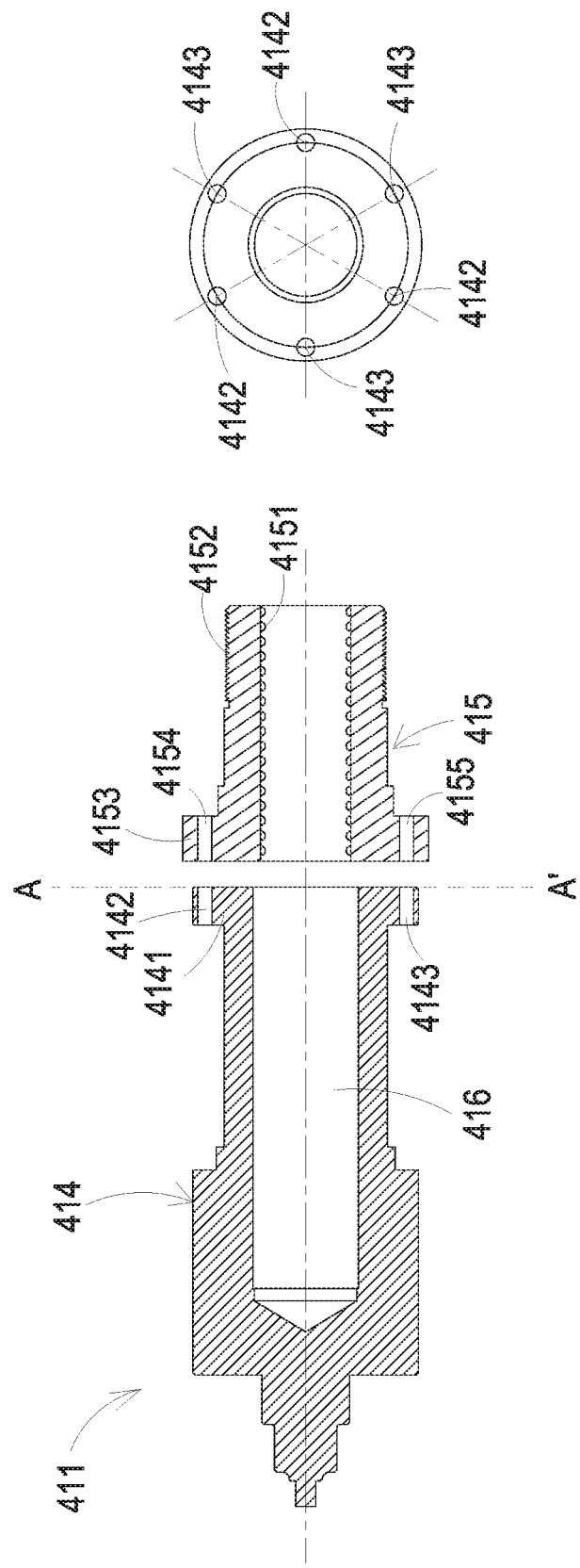
FIG. 5A is an enlarged partial view illustrating the linear driving system of FIG. 4.
FIG. 5B is a cross-sectional view taken along the line A-A' of the rotor of FIG. 5A.

FIG. 4 is a schematic longitudinal cross-sectional view showing a linear driving system according to a second embodiment of the present invention, FIG. 5A is an enlarged partial view illustrating the linear driving system of FIG. 4, and FIG. 5B is a cross-sectional view taken along the line A-A' of the rotor of FIG. 5A. As shown in FIGS. 4, 5A and 5B, the linear driving system 4 comprises a motor 41, a screw shaft 42 and a table 43. The structures and operations of the motor 41, the screw shaft 42 and the table 43 are similar to those of FIG. 2, and are not redundantly described herein. Therefore, the position sensor 410 of FIG. 4 is similar to the position sensor 210 of FIG. 2. The permanent magnets 417 of FIG. 4 are similar to the permanent magnets 217 of FIG. 2. The second end portion 422 of FIG. 4 is similar to the second end portion 222 of FIG. 2. The baffle plate 423 of FIG. 4 is similar to the baffle plate 223 of FIG. 2. The block 431 of FIG. 4 is similar to the block 231 of FIG. 2. The platform 432 of FIG. 4 is similar to the platform 232 of FIG. 2. The linear bearing 433 of FIG. 4 is similar to the linear bearing 233 of FIG. 2. The motor 41 comprises a rotor 411, a stator 412 and a ball bearing 413. The rotor 411 comprises a shaft part 414 and a spiral part 415. The shaft part 414 and the spiral part 415 are independent parts and detachably assembled together by an assembling method. The shaft part 414 and the spiral part 415 jointly comprise an accommodation space 416. Namely, the accommodation space 416 is a hollow space within the shaft part 414 and the spiral part 415.

The shaft part 414 of the rotor 411 of the motor 41 further comprises a first connection part 4141 disposed on the outer circumference of the end of the shaft part 414. The first connection part 4141 comprises at least one first fixing hole 4142 and at least one first locating hole 4143. As shown in FIG. 5B, the first connection part 4141 comprises three fixing holes 4142 and three locating holes 4143, those are alternately located on the outer circumference of the first connection part 4141. The spiral part 415 of the rotor 411 of the motor 41 further comprises a second connection part 4153 disposed on the outer circumference of the end of the spiral part 415, wherein the end of the spiral part 415 is adjacent to the shaft part 414. The second connection part 4153 is adjacent to the first connection part 4141. The second connection part 4153 comprises at least one second fixing hole 4154 corresponding to the first fixing hole 4142 and at least one second locating hole 4155 corresponding to the first locating hole 4143. The first locating hole 4143 and the second locating hole 4155 are configured to locate the shaft part 414 and the spiral part 415. The shaft part 414 of the rotor 411 further comprises at least one connection element 4156. The connection element 4156 inserts into the corresponding first fixing holes 4142 of the first connection part 4141 and the corresponding second fixing hole 4154 of the second connection part 4153 for connecting with the first fixing holes 4142 and the second fixing hole 4154, so that the shaft part 414 and the spiral part 415 are fixed. The shaft part 414 is coaxially coupled with the spiral part 415. The shaft part 414 is detachably assembled with the spiral part 415 so that the rotor 411 can be maintained easily.

In this embodiment, the ball bearing 413 is disposed around the outer surface of the spiral part 415. The motor 41 of the linear driving system 4 further comprises a fixing element 418 disposed on the outer surface of the spiral part 415 of the rotor 411. The fixing element 418 is adjacent to the ball bearing 413. The fixing element 418 comprises a first end 4181 and a second end 4182. The first end 4181 of the fixing element 418 is adjacent to the ball bearing 413 and inserts into the ball bearing 413, so that the ball bearing 413 is fixed on the spiral part 415 by the fixing element 418. The ball bearing 413 is disposed on the outer surface of the spiral part 415. The second end 4182 of the fixing element 418 comprises a fourth helical protrusion 4183 formed on the outer surface thereof. The fourth helical protrusion 4183 is adjacent to the outer surface of the spiral part 415. The fourth helical protrusion 4183 is engaged with the third helical protrusion 4152 of the spiral part 415, so that the fixing element 418 is connected with the spiral part 415. In another embodiment, the motor 41 further comprises a supporting element 419 adjacent to the ball bearing 413 for supporting the ball bearing 413.

When the rotor 411 of the motor 41 is rotated by the driving force, the first helical protrusion 4151 of the spiral part 415 of the rotor 41 is rotated accordingly, and the second helical protrusion 4211 of the screw shaft 42 engaged with the first helical protrusion 4151 of the spiral part 415 of the motor 41 is driven to rotate, so that the spiral part 415 drives the screw shaft 42 to move forward or backward linearly in the axial direction of the rotor 411. The first end portion 421 of the screw shaft 42 is directly connected with the rotor 411 and accommodated within the accommodation space 416 of the rotor 411 without installing additional device to connect with the screw shaft 42 and the rotor 411 of the motor 41. Therefore, the inventive linear driving system 4 has enhanced rigidity, faster response speed, and lower cost. In addition, the first helical protrusion 4151 is engaged with the second helical protrusion 4211 for connecting with the spiral part 415 of the rotor 411 of the motor 41 and the screw shaft 42, so that the spiral part 415 is configured as the nut of the screw shaft 42. According to the conventional linear driving system 1, it is necessary to dispose a bearing 15 beside the electric motor 11 to fix the screw shaft 121, and a lock-nut 16 must be fixed for fixing the securing the bearing 15. Comparing with the conventional linear driving system 1, a bearing 15 and a lock-nut 16 in the conventional linear driving system 1 of FIG. 1 can be omitted, and the linear driving system 4 of present invention is advantageous because of lower cost, saving space and easier maintaining.

Figure 6:
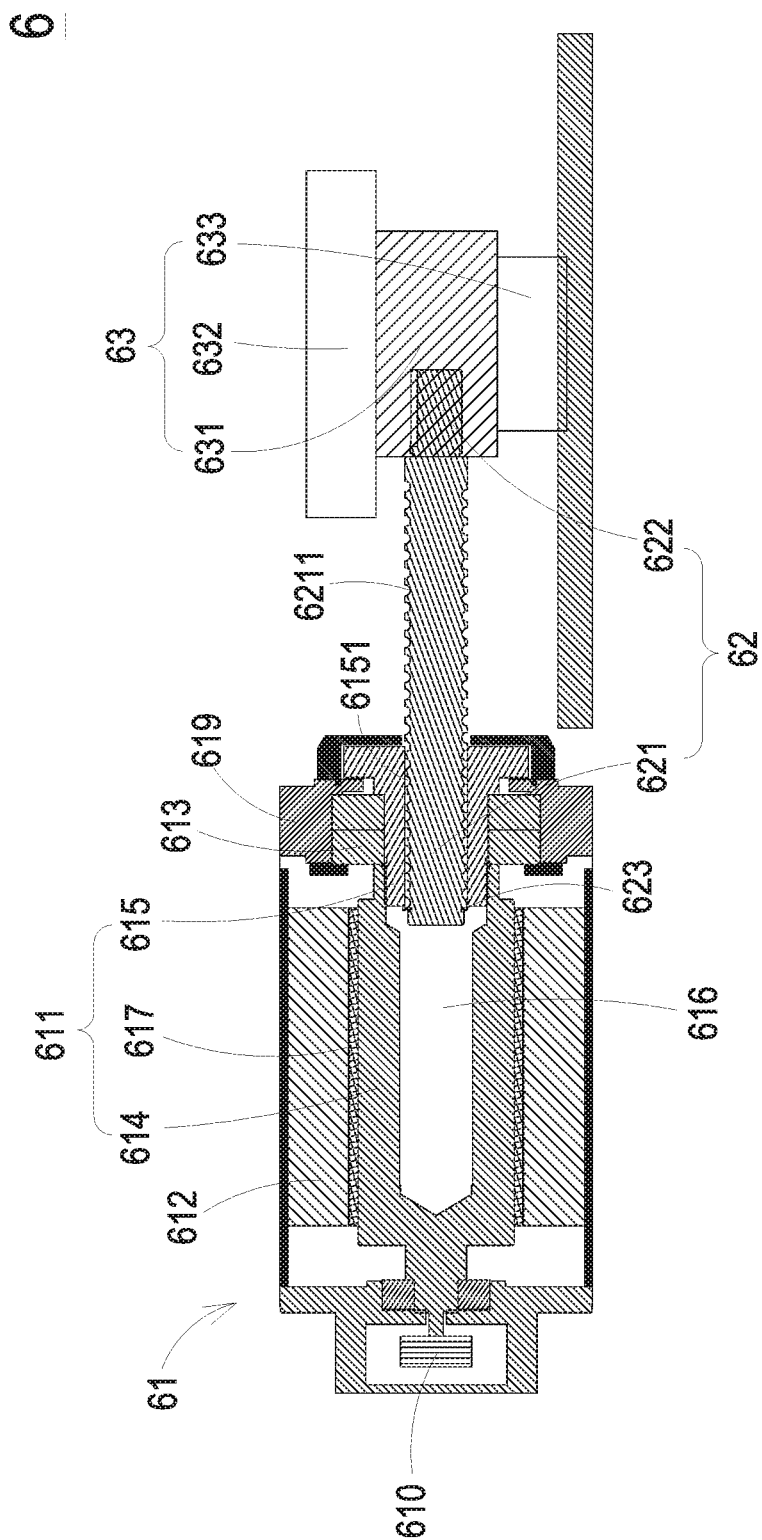
FIG. 6 is a schematic longitudinal cross-sectional view showing a linear driving system according to a third embodiment of the present invention.
Figure 7:
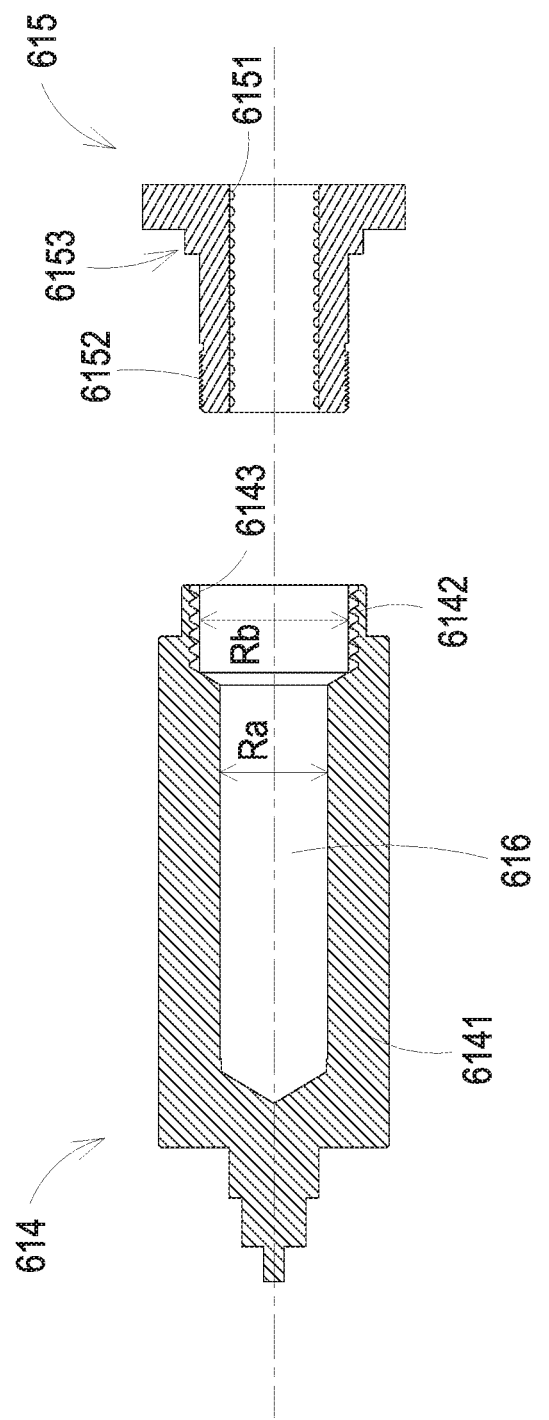
FIG. 7 is an enlarged partial view illustrating the linear driving system of FIG. 6.

FIG. 6 is a schematic longitudinal cross-sectional view showing a linear driving system according to a third embodiment of the present invention, and FIG. 7 is an enlarged partial view illustrating the linear driving system of FIG. 6. As shown in FIGS. 6 and 7, the linear driving system 6 comprises a motor 61, a screw shaft 62 and a table 63. The structures and operations of the motor 61, the screw shaft 62 and the table 63 are similar to those of FIG. 2, and are not redundantly described herein. Therefore, the position sensor 610 of FIG. 6 is similar to the position sensor 210 of FIG. 2. The permanent magnets 617 of FIG. 6 are similar to the permanent magnets 217 of FIG. 2. The second end portion 622 of FIG. 6 is similar to the second end portion 222 of FIG. 2. The baffle plate 623 of FIG. 6 is similar to the baffle plate 223 of FIG. 2. The block 631 of FIG. 6 is similar to the block 231 of FIG. 2. The platform 632 of FIG. 6 is similar to the platform 232 of FIG. 2. The linear bearing 633 of FIG. 6 is similar to the linear bearing 233 of FIG. 2. The motor 61 comprises a rotor 611, a stator 612 and a ball bearing 613. The rotor 611 comprises a shaft part 614 and a spiral part 615. The shaft part 614 and the spiral part 615 are independent parts and detachably assembled together by an assembling method. The shaft part 614 and the spiral part 615 jointly comprise an accommodation space 616. Namely, the accommodation space 616 is a hollow space within the shaft part 614 and the spiral part 615.

The shaft part 614 of the rotor 611 comprises a shaft main body 6141 and an extension part 6142. The shaft main body 6141 is connected with the extension part 6142. The inner diameter Ra of the shaft main body 6141 is smaller than the inner diameter Rb of the extension part 6142. The extension part 6142 comprises a fifth thread 6143 formed on the inner surface thereof. The spiral part 615 comprises a sixth thread 6152 formed on the outer surface of the spiral part 615. The sixth thread 6152 is corresponding to the fifth thread 6143. The sixth thread 6152 is engaged with the fifth thread 6143 for assembling with the shaft part 614 and the spiral part 615, so that the extension part 6142 is disposed around at least portion of the outer surface of the spiral part 615. The shaft part 614 is detachably assembled with the spiral part 615 so that the rotor 611 can be maintained easily.

In some embodiments, the spiral part 615 further comprises a protruding part 6153 formed on the outer surface thereof. The protruding part 6153 is a protrusion structure. The ball bearing 613 is disposed between the end of the extension part 6142 of the shaft part 614 and the protruding part 6153 of the spiral part 615. The ball bearing 613 is disposed on the outer surface of the spiral part 615. In another embodiment, the motor 61 further comprises a supporting element 619 adjacent to the ball bearing 613 for supporting the ball bearing 613.

When the rotor 611 of the motor 61 is rotated by the driving force, the first helical protrusion 6151 of the spiral part 615 of the rotor 61 is rotated accordingly, and the second helical protrusion 6211 of the screw shaft 62 engaged with the first helical protrusion 6151 of the spiral part 615 of the motor 61 is driven to rotate, so that the spiral part 615 drives the screw shaft 62 to move forward or backward linearly in the axial direction of the rotor 611. The first end portion 621 of the screw shaft 62 is directly connected with the rotor 611 and accommodated within the accommodation space 616 of the rotor 611 without installing additional device to connect with the screw shaft 62 and the rotor 611 of the motor 61. Therefore, the inventive linear driving system 6 has enhanced rigidity, faster response speed, and lower cost. In addition, the first helical protrusion 6151 is engaged with the second helical protrusion 6211 for connecting with the spiral part 615 of the rotor 611 of the motor 61 and the screw shaft 62, so that the spiral part 615 is configured as the nut of the screw shaft 62. According to the conventional linear driving system 1, it is necessary to dispose a bearing 15 beside the electric motor 11 to fix the screw shaft 121, and a lock-nut 16 must be fixed for fixing the securing the bearing 15. Comparing with the conventional linear driving system 1, a bearing 15 and a lock-nut 16 in the conventional linear driving system 1 of FIG. 1 can be omitted, and the linear driving system 6 of present invention is advantageous because of lower cost, saving space and easier maintaining.

Figure 8:
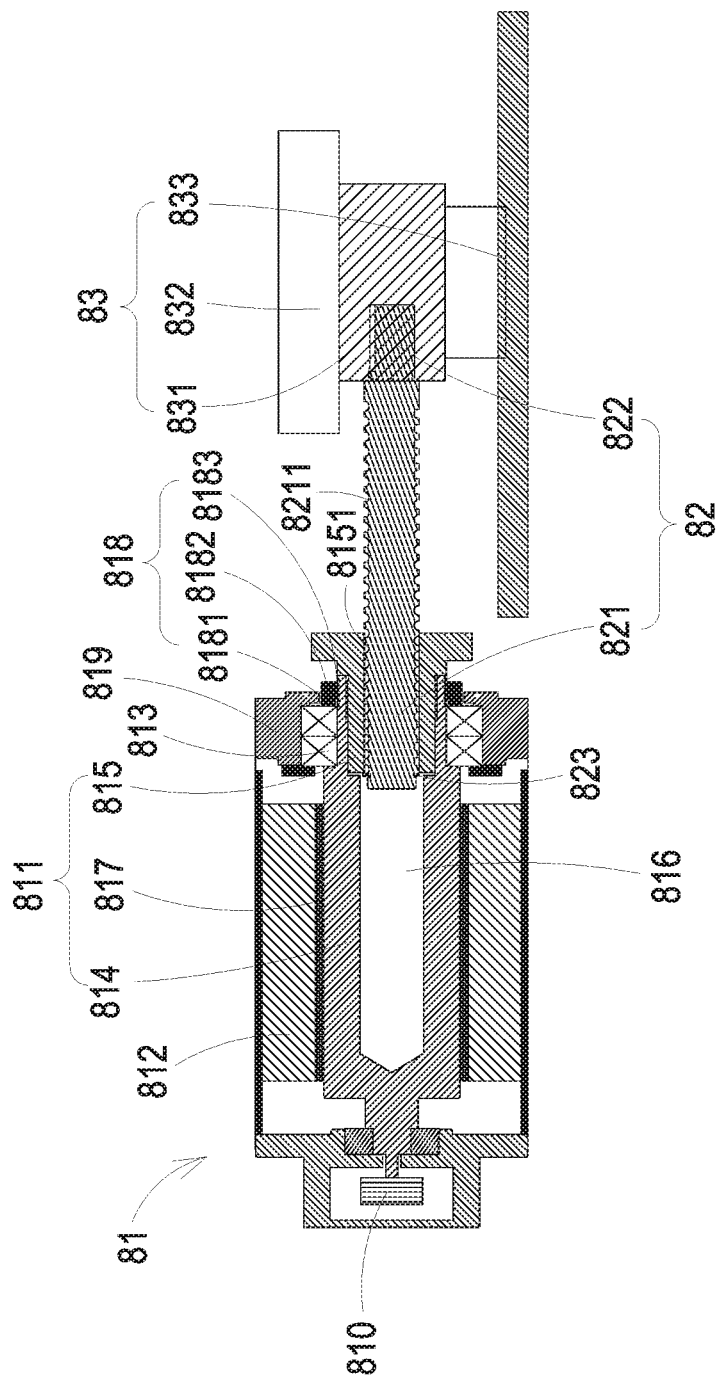
FIG. 8 is a schematic longitudinal cross-sectional view showing a linear driving system according to a fourth embodiment of the present invention.
Figure 9:
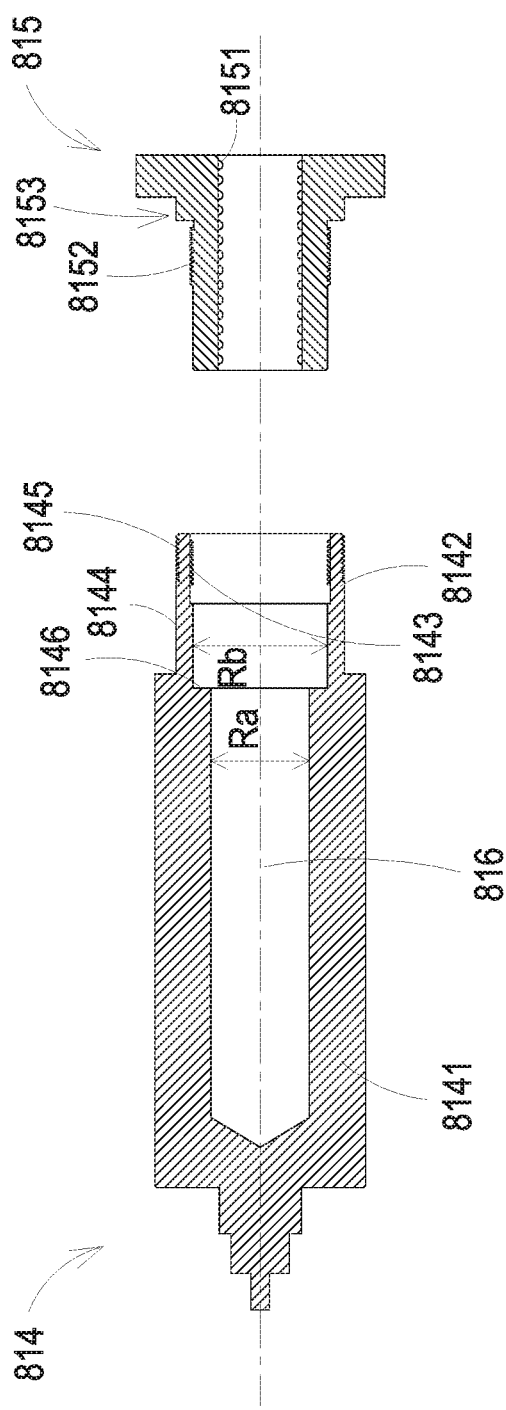
FIG. 9 is an enlarged partial view illustrating the linear driving system of FIG. 8.

FIG. 8 is a schematic longitudinal cross-sectional view showing a linear driving system according to a fourth embodiment of the present invention, and FIG. 9 is an enlarged partial view illustrating the linear driving system of FIG. 8. As shown in FIGS. 8 and 9, the linear driving system 8 comprises a motor 81, a screw shaft 82 and a table 83. The structures and operations of the motor 81, the screw shaft 82 and the table 83 are similar to those of FIG. 2, and are not redundantly described herein. Therefore, the position sensor 810 of FIG. 8 is similar to the position sensor 210 of FIG. 2. The permanent magnets 817 of FIG. 8 are similar to the permanent magnets 217 of FIG. 2. The second end portion 822 of FIG. 8 is similar to the second end portion 222 of FIG. 2. The baffle plate 823 of FIG. 8 is similar to the baffle plate 223 of FIG. 2. The block 831 of FIG. 8 is similar to the block 231 of FIG. 2. The platform 832 of FIG. 8 is similar to the platform 232 of FIG. 2. The linear bearing 833 of FIG. 8 is similar to the linear bearing 233 of FIG. 2. The motor 81 comprises a rotor 811, a stator 812 and a ball bearing 813. The rotor 811 comprises a shaft part 814 and a spiral part 815. The shaft part 814 and the spiral part 815 are independent parts and detachably assembled together by an assembling method. The shaft part 814 and the spiral part 815 jointly comprise an accommodation space 816. Namely, the accommodation space 816 is a hollow space within the shaft part 814 and the spiral part 815.

The shaft part 814 of the rotor 811 comprises a shaft main body 8141 and an extension part 8142. The shaft main body 8141 is connected with the extension part 8142. The inner diameter Ra of the shaft main body 8141 is smaller than the inner diameter Rb of the extension part 8142. The extension part 8142 comprises a fifth thread 8143 formed on the inner surface thereof. The spiral part 815 comprises a sixth thread 8152 formed on the outer surface of the spiral part 815. The sixth thread 8152 is corresponding to the fifth thread 8143.

The sixth thread 8152 is engaged with the fifth thread 8143 for assembling with the shaft part 814 and the spiral part 815, so that the extension part 8142 is disposed around at least portion of the outer surface of the spiral part 815.

The extension part 8142 comprises a mounting surface 8144 and a seventh thread 8145 formed on the outer surface thereof. The mounting surface 8144 is configured to carry the ball bearing 813. The motor 81 of the linear driving system 8 further comprises a fixing element 818 disposed on the outer surface of the extension part 8142 of the shaft part 814 of the rotor 811. The fixing element 818 is adjacent to the ball bearing 813. The fixing element 818 comprises a first end 8181 and a second end 8182. The first end 8181 of the fixing element 818 is adjacent to the ball bearing 813 and inserts into the ball bearing 813, so that the ball bearing 813 is fixed on the spiral part 815 by the fixing element 818. The second end 8182 of the fixing element 818 comprises a fourth helical protrusion 8183 formed on the inner surface thereof. The fourth helical protrusion 8183 is adjacent to the outer surface of the extension part 8142 of the shaft part 814. The fourth helical protrusion 8183 is engaged with the seventh thread 8145 of the shaft part 814, so that the fixing element 818 is connected with the shaft part 814.

In this embodiment, the shaft part 814 further comprises a positioning part 8146 disposed on the inner surface of the shaft part 814. The positioning part 8146 is engaged with the leading edge of the spiral part 815 so that the spiral part 815 is positioned with the shaft part 814. Consequently, the positioning is more precise when the spiral part 815 is connected with the shaft part 814.

In some embodiment, the spiral part 815 further comprises a protruding part 8153 formed on the outer surface thereof. The protruding part 8153 is a protrusion structure. When the shaft part 814 is connected with the spiral part 815, the extension part 8142 of the shaft part 814 is in contact with the protruding part 8153 of the spiral part 815. In another embodiment, the motor 81 further comprises a supporting element 819 adjacent to the ball bearing 813 for supporting the ball bearing 813.

When the rotor 811 of the motor 81 is rotated by the driving force, the first helical protrusion 8151 of the spiral part 815 of the rotor 81 is rotated accordingly, and the second helical protrusion 8211 of the screw shaft 82 engaged with the first helical protrusion 8151 of the spiral part 815 of the motor 81 is driven to rotate, so that the spiral part 815 drives the screw shaft 82 to move forward or backward linearly in the axial direction of the rotor 811. The first end portion 821 of the screw shaft 82 is directly connected with the rotor 811 and accommodated within the accommodation space 816 of the rotor 811 without installing additional device to connect with the screw shaft 82 and the rotor 811 of the motor 81. Therefore, the inventive linear driving system 8 has enhanced rigidity, faster response speed, and lower cost. In addition, the first helical protrusion 8151 is engaged with the second helical protrusion 8211 for connecting with the spiral part 815 of the rotor 811 of the motor 81 and the screw shaft 82, so that the spiral part 815 is configured as the nut of the screw shaft 82. According to the conventional linear driving system 1, it is necessary to dispose a bearing 15 beside the electric motor 11 to fix the screw shaft 121, and a lock-nut 16 must be fixed for fixing the securing the bearing 15. Comparing with the conventional linear driving system 1, a bearing 15 and a lock-nut 16 in the conventional linear driving system 1 of FIG. 1 can be omitted, and the linear driving system 8 of present invention is advantageous because of lower cost, saving space and easier maintaining.

From the above descriptions, the present invention provides a linear driving system. The first end portion of the screw shaft of the linear driving system is directly connected with the rotor and accommodated within the accommodation space of the rotor without installing a coupling to connect with the screw shaft and the rotor of the motor. Therefore, the inventive linear driving system has enhanced rigidity, faster response speed, and lower cost. In addition, the first helical protrusion is engaged with the second helical protrusion for connecting with the spiral part of the rotor of the motor and the screw shaft, so that the spiral part is configured as the nut of the screw shaft. According to the conventional linear driving system, it is necessary to dispose a bearing beside the electric motor to fix the screw shaft, and a lock-nut must be fixed for fixing the securing the bearing. Comparing with the conventional linear driving system, a bearing and a lock-nut in a conventional linear driving system can be omitted, and the linear driving system of present invention is advantageous because of lower cost, saving space and easier maintaining.

While the invention has been described in terms of what is presently considered to be the most practical and preferred embodiments, it is to be understood that the invention needs not be limited to the disclosed embodiment.

What is claimed is:

1. A linear driving system, comprising:
a motor comprising a rotor, a stator and a ball bearing, wherein the rotor comprises a shaft part and a spiral part, the shaft part and the spiral part jointly comprise an accommodation space, and the spiral part comprises a first helical protrusion formed on an inner surface thereof, the shaft part and the spiral part are arranged in the direction of an axial of the rotor, wherein the shaft part comprises at least one first fixing hole, the spiral part comprises at least one second fixing hole corresponding to the at least one first fixing hole, wherein a connection element inserts into the corresponding first fixing hole and the corresponding second fixing hole for fixing the shaft part and the spiral part, wherein the shaft part and the spiral part are joined end-to-end in a collinear configuration;
a screw shaft coaxially coupled with the rotor, wherein one end of the screw shaft comprises a second helical protrusion formed on an outer surface thereof, and at least portion of the end of the screw shaft is accommodated within the accommodation space of the rotor; and
a table fixed on the other end of the screw shaft, wherein the first helical protrusion of the spiral part of the rotor is engaged with the second helical protrusion of the screw shaft, wherein when the rotor is rotated, the rotor drives the screw shaft and the table connected with the screw shaft to move forward or backward linearly in the direction of the axial of the rotor.

2. The linear driving system according to claim 1, wherein the ball bearing is disposed around an outer surface of the spiral part and configured to support the rotor.

3. The linear driving system according to claim 1, wherein the spiral part comprises a third helical protrusion formed on an outer surface thereof.

4. The linear driving system according to claim 3, wherein the motor further comprises a fixing element, wherein the fixing element comprises a first end and a second end, the first end is connected with the ball bearing, the second end comprises a fourth helical protrusion formed on an inner surface thereof, wherein the fourth helical protrusion is engaged with the third helical protrusion, so that the fixing element is connected with the spiral part.

5. The linear driving system according to claim 1, wherein the shaft part and the spiral part are integrally formed into one piece.

6. The linear driving system according to claim 1, wherein the shaft part and the spiral part are independent parts and detachably assembled together.

7. The linear driving system according to claim 6, wherein the ball bearing is disposed around an outer surface of the spiral part and configured to support the rotor.

8. The linear driving system according to claim 6, wherein the shaft part comprises at least one first locating hole, the spiral part comprises at least one second locating hole corresponding to the at least one first locating hole, wherein the at least one first locating hole and the at least one second locating hole are configured to locate the shaft part and the spiral part.

9. The linear driving system according to claim 6, wherein the shaft part comprises a shaft main body and an extension part, wherein an inner diameter of the shaft main body is smaller than an inner diameter of the extension part.

10. The linear driving system according to claim 9, wherein the extension part comprises a fifth thread formed on an inner surface thereof, the spiral part comprises a sixth thread formed on an outer surface thereof, wherein the sixth thread is engaged with the fifth thread so that the shaft part and the spiral part are assembled together.

11. The linear driving system according to claim 9, wherein the spiral part comprises a protruding part, the ball bearing is disposed between the extension part of the shaft part and the protruding part of the spiral part.

12. The linear driving system according to claim 9, wherein the extension part is disposed between the ball bearing and the spiral part.

13. The linear driving system according to claim 9, wherein the extension part comprises a mounting surface and a seventh thread formed on an outer surface thereof, wherein the mounting surface is configured to mount the ball bearing, and the seventh thread is configured to connect with the ball bearing and the spiral part by a fixing element.

14. The linear driving system according to claim 9, wherein the shaft part comprises a positioning part engaged with a leading edge of the spiral part so that the spiral part is positioned with the shaft part.

15. The linear driving system according to claim 1, wherein the shaft part is free of helical protrusion formed on an inner surface thereof.

* * * * *